(No Model.) 4 Sheets—Sheet 1.
W. ROBINSON.
CAR TRUCK.
No. 491,497. Patented Feb. 7, 1893.
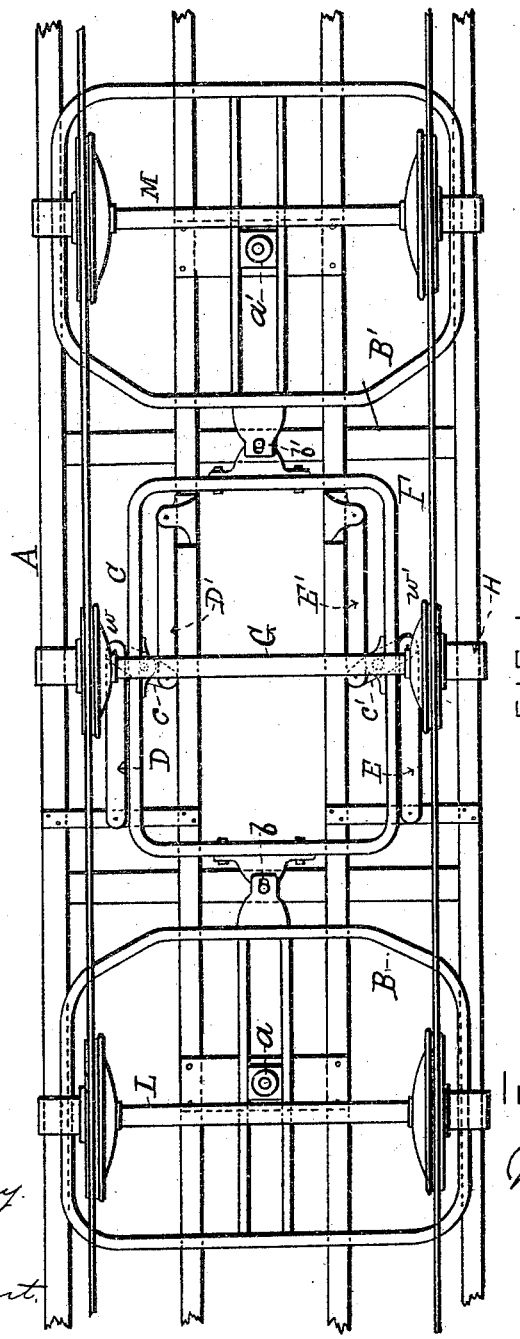
FIG. I.
WITNESSES:
Jas. W. Ripley.
C. E. Grant.
INVENTOR:
Wm. Robinson.

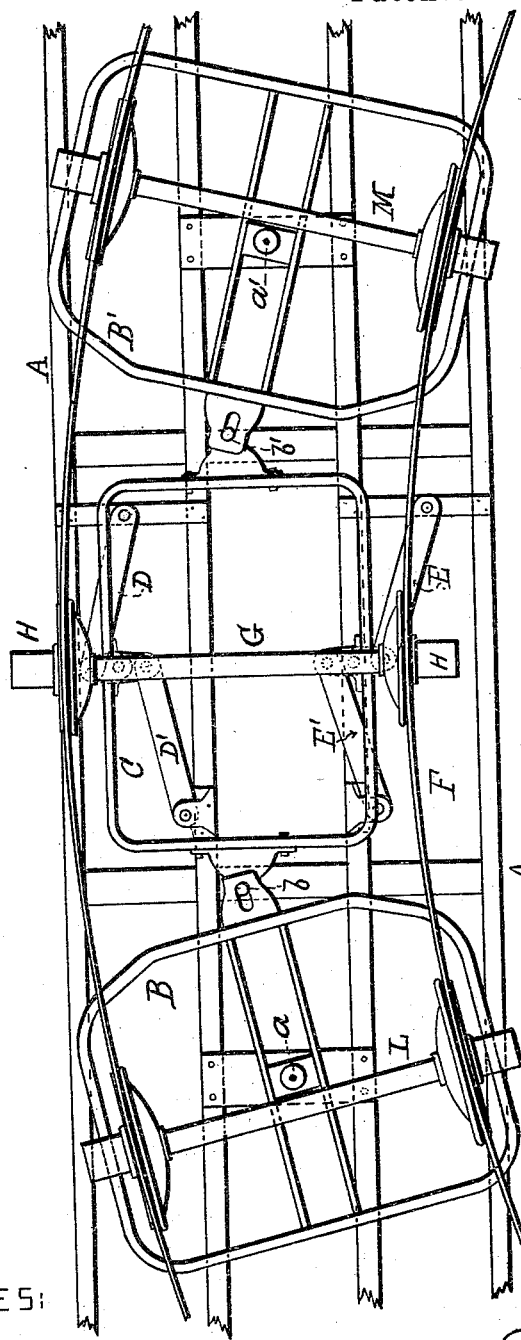

(No Model.)  4 Sheets—Sheet 3.
W. ROBINSON.
CAR TRUCK.
No. 491,497. Patented Feb. 7, 1893.
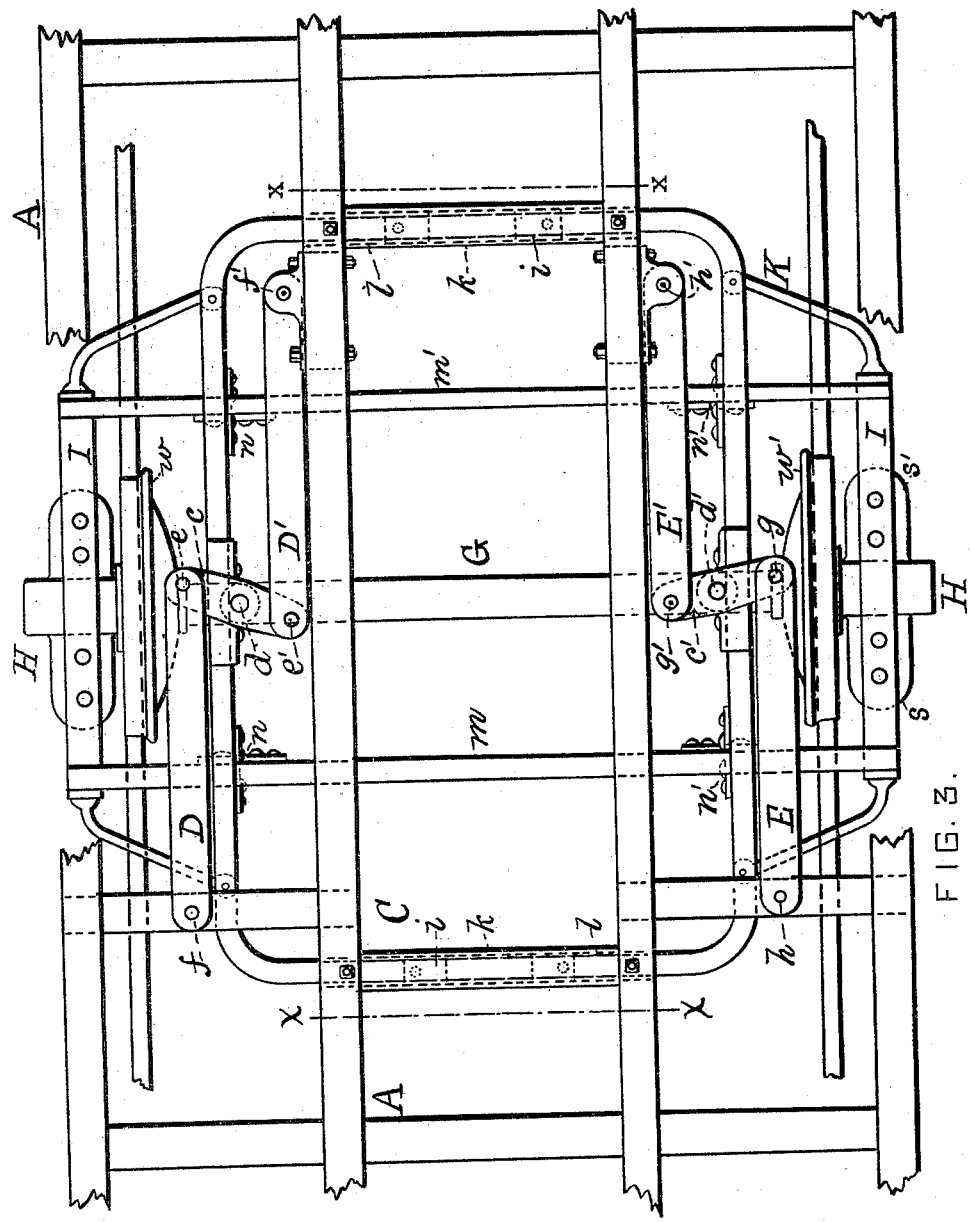
WITNESSES:
Jas. H. Ripley.
C. E. Grant.
INVENTOR:
Wm. Robinson.

(No Model.)
W. ROBINSON.
CAR TRUCK.
No. 491,497.
4 Sheets—Sheet 4.
Patented Feb. 7, 1893.
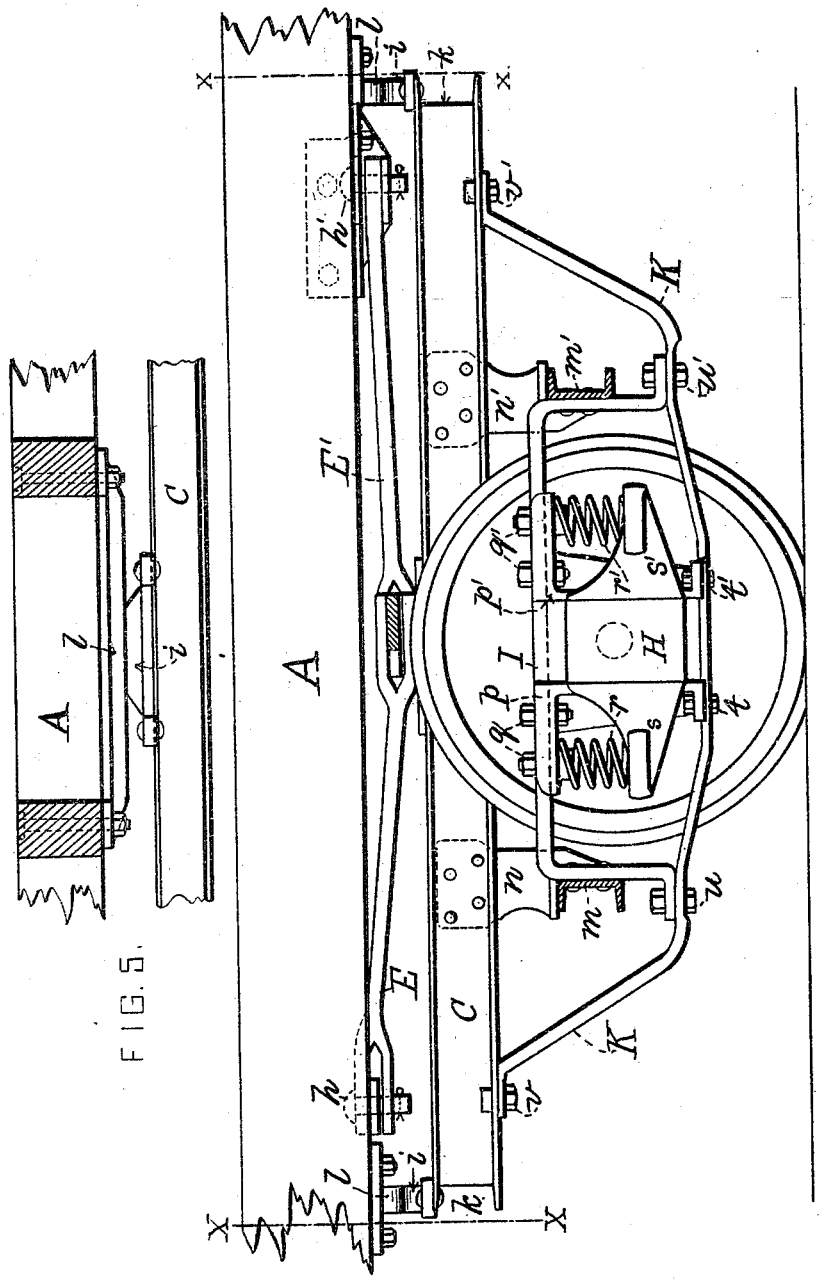
WITNESSES:
Jas. H. Ripley.
C. E. Grant.
INVENTOR:
Wm. Robinson.

UNITED STATES PATENT OFFICE.

WILLIAM ROBINSON, OF BOSTON, MASSACHUSETTS, ASSIGNOR TO THE ROBINSON RADIAL CAR TRUCK COMPANY, OF PORTLAND, MAINE.

CAR-TRUCK.

SPECIFICATION forming part of Letters Patent No. 491,497, dated February 7, 1893.

Application filed September 5, 1892. Serial No. 445,102. (No model.)

*To all whom it may concern:*

Be it known that I, WILLIAM ROBINSON, a citizen of the United States, residing at Boston, in the county of Suffolk and State of Massachusetts, have invented a new and useful Improvement in Car-Trucks, of which the following is a specification.

My invention refers especially to improvements in six wheeled radial car trucks in which the end trucks are arranged to swivel and the center truck to travel directly across the car body side-wise.

My invention consists chiefly in a center truck of improved construction and operation, and means for connecting the same, in a simple and operative manner, to the car body.

The nature of my invention will be understood from the description which follows, reference being had to the accompanying drawings, which form a part of this specification, in which—

Figure 1 is a bottom plan view of a six-wheeled radial car truck on a straight track, illustrating my invention; Fig. 2 is a bottom plan view of the same on a curved track; Fig. 3 is an enlarged plan view of the center truck, illustrating my invention; Fig. 4 is a side elevation of the same, and Fig. 5 is a cross section through the lines $x$, $x$, Figs. 3 and 4.

All the figures show portions of the car framing in connection with the trucks.

Similar letters of reference indicate corresponding parts in all the figures.

A is a car frame to which the end truck or axle frames B, B' are pivotally connected, as shown at $a$, $a'$. C is the center truck or axle frame flexibly connected to the end frames B, B', in any usual or suitable manner, as shown at $b$, $b'$. To the frame C, the links $c$, $c'$ are pivoted at $d$, $d'$, which are points preferably over the axle G and as near the wheels $w$, $w'$ as practicable.

The bars D, D' have their inner ends pivotally connected to the opposite ends of the link $c$, as shown at $e$, $e'$, while the opposite or outer ends of said bars D, D' are pivotally connected to the car frame A, as shown at $f$, $f'$. In like manner, the bars E, E' have their inner ends pivotally connected to the opposite ends of the link $c'$, as shown at $g$, $g'$, while their opposite or outer ends are pivotally connected to the car body A, as shown at $h$, $h'$. The object of these bar and link connections is to control the position of the truck frame C and to cause the same to travel across the car body A in a straight line.

The operation is as follows: When the complete radial truck F is on a straight track, as shown in Fig. 1, the bars D, D', E, E' and the links $c$, $c'$ are in their normal position, as shown in that figure, said bars and links permitting said truck frame C to travel across the car frame A, but in no other direction. Now when the truck F reaches a curved track, as shown in Fig. 2, the curving rails cause said center truck frame C to travel across the car body A, in order to conform to the curving rails. This motion of said center truck frame C causes the end truck frames B, B' to swivel on their axes $a$, $a'$, whereby all the axles in the truck F become radial to the curve around which said truck is passing. In this case the bars D, D', and E, E' swing from their normal position and assume the angular position, with reference to the truck frame C and the car body A, shown in said Fig. 2. At the same time, the links $c$, $c'$ turn on their pivotal points $d$, $d'$, thus compensating for the changed position of the swinging bars D, D' and E, E'. Thus it will be seen that the said swinging bars D, D' and E, E' hold the pivotal points $d$, $d'$ of the links $c$, $c'$ in a straight line and allow said pivotal points to travel across the car body in a straight line at right angles to the longitudinal center of said car body. In other words, the center axle G with its frame C, is caused, by said swinging bars and links, to travel across said car body A in a straight line. Thus it will be observed that the friction or roller side bearings usually used to guide the movement of the center truck frame C straight across the car body, are dispensed with and a perfect parallel motion secured without them.

In order to prevent any end tipping of the truck frame C, I secure the friction plates $i$ at or near the longitudinal center of said truck frame C at opposite sides of the center axle G, and, preferably, as far away from said axle as practicable. In this case, I secure said friction plates *i* at the ends of said truck frame C, as shown at *k*. To the car body I secure the corresponding friction plates *l* which travels upon said friction plates *i*.

In practice, in using this truck on motor cars, I carry nearly the whole weight of the car and its load on the end trucks B, B', for the purpose of increasing the traction of the end wheels, which are drivers; from this fact it is evident that the friction between the plates *i* and *l* of the center truck C will be comparatively light while being sufficient to steady said truck C and keep it from tipping.

In using this radial truck on open cars, the center journal box H projects under the side foot-board of the open car, while the car is traveling on curves. It is necessary therefore, to make the housings of said box H very low in order to travel freely under said foot-board. I accomplish this as follows: The center frame C I usually make of channel iron. Below this I run, crosswise, the straight channel bars *m*, *m'* which are firmly secured to said frame C by means of the castings *n*, *n'*, which are securely riveted both to the frame C and to said channel bars *m*, *m'*. The steel bar I, bent downwardly at each end, and securely riveted to the outer ends of said channel bars *m*, *m'*, forms a crown plate to which the pedestals *p*, *p'* are securely bolted by the bolts *q*, *q'*. The said bar or plate I is supported by the springs *r*, *r'*, the lower ends of which rest upon the lugs or projections *s*, *s'* of the box H. The brace K is bolted to the lower ends of the pedestals *p*, *p'* as shown at *t*, *t'*, and also to the lower ends of the bar I, as shown at *u*, *u'* and to the frame C as shown at *v*, *v'*; thus the bar I and pedestals *p*, *p'* are securely braced to the truck frame C. This bracing, of course, extends, through the bar I, to those portions of the channel bars *m*, *m'* extending beyond or outside of, the frame C. The box H plays up and down between the pedestals *p*, *p'*, said box being provided with lugs or guides, in the usual manner, to hold it in proper position relatively to said pedestals. Thus it will be seen that I provide, in a simple and effective manner for keeping the housing of the box H very low.

The frame C and cross bars *m*, *m'*, described herein as made of channel iron, may, of course be made of any form and material without effecting the spirit of my invention.

I have herein described the upper frame A as a "car-frame," but in constructing radial trucks for twelve wheel coaches the frame A, that is, the frame under which the single axle frames operate, becomes the "main truck frame" upon which the car body swivels. For the purposes of this invention, therefore, the terms "car frame" and "main truck frame" must be regarded as interchangeable and equivalent terms.

I do not herein claim, by itself, the mechanical movement described and broadly claimed in my application for a patent on a mechanical movement, filed June 23, 1892, Serial No. 437,765, allowed August 26, 1892.

Having thus described my invention what I claim as new and desire to secure by Letters Patent is:—

1. In a car or truck, the combination, substantially as described, of a main frame, a truck or axle frame arranged to travel across said main frame, links or levers pivotally connected to said axle frame, and swing bars having their inner ends pivotally connected to said links and their outer ends to said main frame.

2. In a car or truck, the combination of the main frame, an axle frame arranged to travel crosswise of said main frame, a series of swing bars having their outer ends pivotally connected to said main frame and their inner ends to compensating devices attached to said axle frame, the whole arranged to cause said axle frame to travel across said main frame in a straight line, substantially as described.

3. In a car or truck, the combination of the main frame, an axle frame, links pivotally connected to said axle frame, parallel bars having one end pivotally connected to said main frame and the opposite ends pivoted to said links, whereby the swinging movement of said parallel bars will cause said axle frame, with its wheels, to move in a straight line relatively to said main frame, substantially as described.

4. In a car or truck, the combination, substantially as described, of the main frame, an axle frame movable relatively to said main frame, a series of links flexibly connected to said axle frame and two series of controlling bars flexibly connected to said main frame and to said links, said bars controlling the movements of said links, and, through them, the position and direction of movement of said axle frame with its wheels.

5. In a car or truck, the combination, substantially as described, of the main frame A, the truck or axle frame C, the links *c*, *c'*, pivoted to said axle frame C, the parallel bars D, E, each having one of its inner ends pivotally connected to one end of one of said links and its outer end to said main frame A, and the parallel bars D', E', each having one of its inner ends pivotally connected to one of the opposite or free ends of one of said links *c*, *c'*, and its outer end to said main frame A, the series of bars D, E, and D', E', extending in opposite directions from said links *c*, *c'*.

6. In combination, with the main frame A and the truck or axle frame C arranged to travel across said main frame, the friction bearing plates *i*, *l*, secured to said frames respectively, at or near the longitudinal centers of the same, and at opposite sides of the axle G, substantially as described.

7. In a car or truck, the combination, substantially as described, of a frame arranged between the opposite wheels of the truck, cross bars rigidly secured to said frame and extending beyond the outer face of said wheels, a crown bar secured to the outer ends of said cross bars above the journal box and pedestals secured to said crown bar.

8. In a car truck, the combination, substantially as described, of the frame C, the bars $m, m'$ passing below said frame C at opposite sides of the wheels $w, w'$, said bars $m, m'$ being rigidly secured to said frame C, the crown bar I rigidly secured to the outer ends of said cross bars $m, m'$, and the pedestals $p, p'$ secured to said crown bar I.

9. In a car truck, the combination of the following elements: a truck or axle frame arranged between the wheels, cross bars rigidly secured to said frame and extending beyond the outer face of said wheels, crown bars secured to the outer ends of said cross bars, pedestals secured to said crown bars, journal boxes located between said pedestals, and braces bracing the lower ends of said pedestals and crown bars to said axle frame, substantially as described.

10. In a car or truck, the combination, substantially as described, of a main frame, a truck or axle frame arranged to travel across said main frame, links or compensating devices connected to one of said frames, and swing bars having one end pivotally connected to the other frame and their opposite ends pivotally connected to said links or compensating devices.

WILLIAM ROBINSON.

Witnesses:
JAS. W. RIPLEY,
C. E. GRANT.